United States Patent [19]
Otsuka et al.

[11] Patent Number: 6,038,218
[45] Date of Patent: Mar. 14, 2000

[54] CONGESTION CONTROL IN SIGNALLING NETWORK OF COMMON CHANNEL SIGNALLING SYSTEM

[75] Inventors: Masao Otsuka; Hirokazu Iwakura, both of Kawasaki, Japan

[73] Assignee: Fujitsu Limited, Kanagawa, Japan

[21] Appl. No.: 08/705,496

[22] Filed: Aug. 29, 1996

[30] Foreign Application Priority Data

Aug. 30, 1995 [JP] Japan ................................. 7-221711

[51] Int. Cl.[7] ........................... H04Q 11/04; H04M 7/00
[52] U.S. Cl. ........................ 370/236; 370/522; 379/230
[58] Field of Search ................................ 370/229, 230, 370/231, 232, 233, 234, 235, 236, 237, 238, 522, 385, 426; 379/230

[56] References Cited

U.S. PATENT DOCUMENTS

| 5,084,816 | 1/1992 | Boese et al. ............................ 370/225 |
| 5,268,895 | 12/1993 | Topper .................................... 370/385 |
| 5,291,477 | 3/1994 | Liew ....................................... 370/238 |
| 5,541,987 | 7/1996 | Topper et al. ........................... 370/236 |
| 5,650,998 | 7/1997 | Angenot et al. ........................ 370/225 |

FOREIGN PATENT DOCUMENTS

3-236663 10/1991 Japan.
9414264 6/1994 WIPO.
9621309 7/1996 WIPO.

OTHER PUBLICATIONS

"An investigation of congestion dynamics in CCS networks during STP processor overload", Northcote, IEEE International Conference on Communications (Seattle), Part 1 vol. 1, Jun. 1995, pp. 127–131, especially top left hand column of p. 128.

*Primary Examiner*—Chi H. Pham
*Assistant Examiner*—Steven Nguyen
*Attorney, Agent, or Firm*—Helfgott & Karas, P.C.

[57] ABSTRACT

For each of a plurality of signal processors accommodating respective shares of signalling links to be controlled by a signalling point, a congestion-condition level is determined by comparing an overload condition of a central controller and the number of processed signals with their respective threshold values. Any signalling link, whose priority is lower than the priority corresponding to the determined congestion-condition level, is inhibited for use, and a signalling link accommodated in another signal processor is substituted for the inhibited signalling link. In determining the congestion-condition level, a decision is made at predetermined intervals of time as to whether the condition is a congested condition or a congestion cleared condition; if it is a congested condition, the congestion-condition level is raised, and if it is a congestion cleared condition, the congestion-condition level is lowered.

8 Claims, 16 Drawing Sheets

Fig.5

| TYPE OF SIGNAL PROCESSING | (LOGICAL COMPARISON COEFFICIENT) | UPPER THRESHOLD VALUE | LOWER THRESHOLD VALUE |
|---|---|---|---|
| TYPE A | 1 | 6,000 | 4,500 |
| TYPE B | 3 | 2,000 | 1,600 |
| TYPE C | 2 | 3,000 | 2,300 |
| ⋮ | ⋮ | ⋮ | ⋮ |
| TYPE X | 2 | 3,000 | 2,300 |

Fig.6

| SIGNAL PROCESSOR NUMBER | UPPER THRESHOLD VALUE | LOWER THRESHOLD VALUE |
|---|---|---|
| SPR 1 | 80 | 50 |
| SPR 2 | 85 | 75 |
| SPR 3 | 90 | 60 |
| ⋮ | ⋮ | ⋮ |
| SPR X | 85 | 65 |

T: PROCESSOR CONGESTION CONDITION JUDGING PERIOD
n: HIGHEST CONGESTION-CONDITION LEVEL

Fig.8

| SIGNALLING LINK NUMBER | PRIORITY DATA |
|---|---|
| xx - 0 | 1 |
| xx - 1 | 2 |
| xx - 2 | 4 |
| yy - 0 | n |
| yy - 1 | 3 |
| ⋮ | ⋮ |
| zz - 3 | 2 | n : HIGHEST PRIORITY

Fig.9

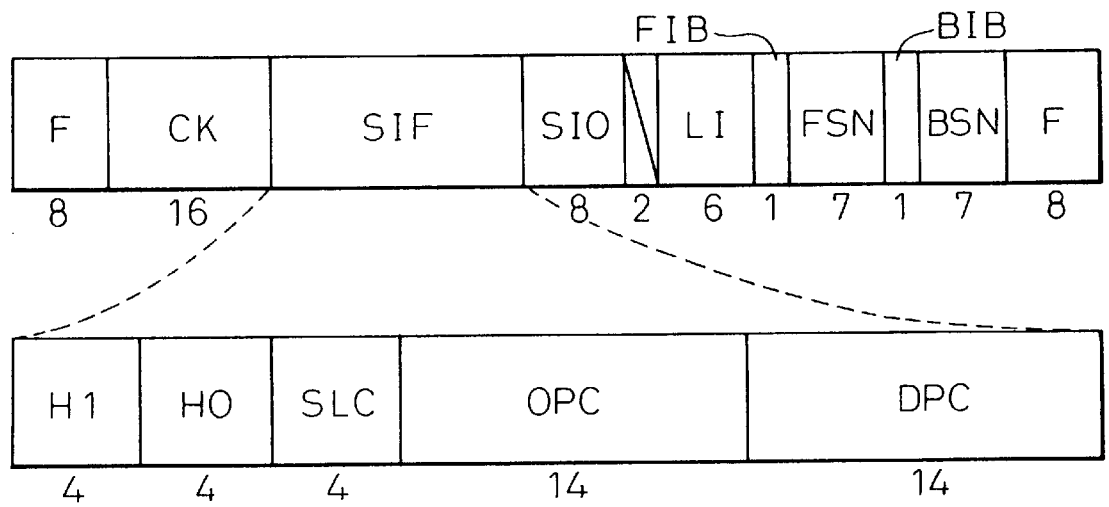

F (Flag)
BSN (Backward sequence number)
BIB (Backward indicator bit)
FSN (Forward sequence number)
FIB (Forward indicator bit)
LI (Length indicator)
SIO (Service information octete)
SIF (Signalling information field)
CK (Check bits)

DPC (Destination point code)
OPC (Originating point code)
SLC (Signalling link code)
H0    Heading code H0
      B (0110) USE-INHIBIT CONTROL SIGNAL
H1    Heading code H1
      B (0001) INHIBIT REQUEST SIGNAL
      B (0010) CLEAR REQUEST SIGNAL
      B (0011) INHIBIT REQUEST ACKNOWLEDGE SIGNAL
      B (0100) CLEAR REQUEST ACKNOWLEDGE SIGNAL
      B (0101) INHIBIT REQUEST REJECT SIGNAL
      B (0110) FORCED CLEAR REQUEST SIGNAL

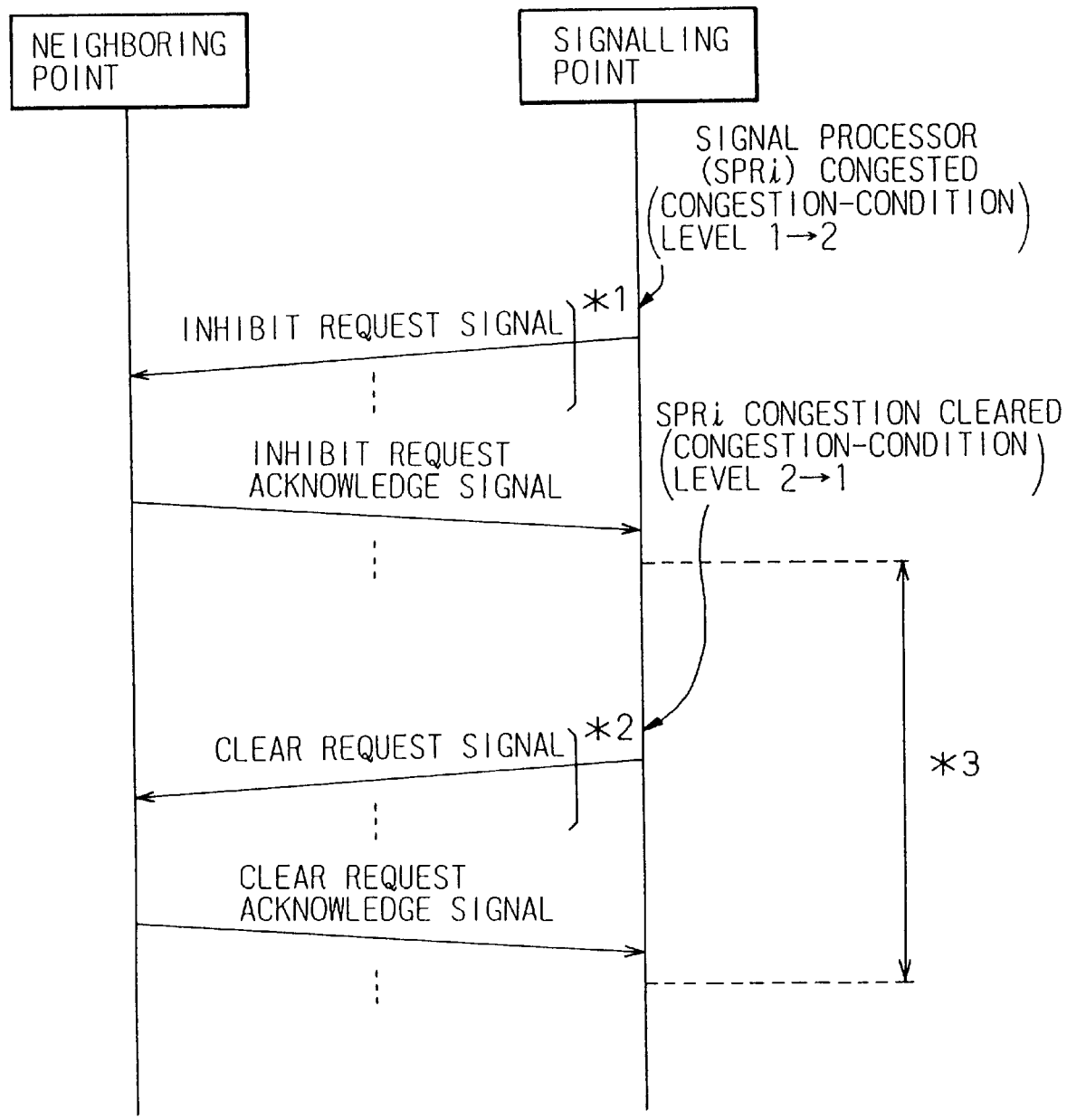

CONGESTION CONTROL IN SIGNALLING NETWORK OF COMMON CHANNEL SIGNALLING SYSTEM

BACKGROUND OF THE INVENTION

1. Field of the Invention

The present invention relates to a method and apparatus for controlling signalling traffic congestion in a signalling network of a common channel signalling system.

2. Description of the Related Art

FIG. 1 shows the configuration of a signalling network using a common channel signalling system. In FIG. 1, reference numerals 200 to 204 are signalling end points (SEPs) each equipped with a call processing facility, 210 to 213 are signalling transfer points (STPs) which do not perform call processing but are dedicated to transferring signals, and #220 to #225 are signalling routes directed from the originating points 200, 201, and 202 to the destination points 203 and 204 via the signalling transfer points 210 and 211. These points are connected to each other by a link set consisting of a plurality of signalling links.

In such a signalling network configuration, a control method focusing attention on destination points of signalling traffic is commonly used to control signalling traffic throughout the signalling network. This control method will be described below by way of example. Suppose here that, at the signalling transfer point 210, congestion of outgoing signalling traffic (1) is detected on a signalling link to the signalling transfer point 211. In this case, to control signalling traffic to be sent out on the affected signalling routes #220 to #225, the signalling transfer point 210 transmits a congestion control signal (2) to all the originating points 200, 201, and 202, indicating that the signalling routes to the designated destination points 203 and 204 are congested. In each of the originating points 200, 201, and 202, in response to the congestion control signal (2) a call processor performs call restrictive control (3) to reduce the signalling traffic to the destination points 203 and 204 designated in the congestion control signal.

In this way, with the signalling traffic control of the prior art, if congestion is detected on any one of the signalling routes defined on the link set from the signalling transfer point 210 to the signalling transfer point 211, transmission restrictive control is enforced en bloc on all the signalling routes on that link set by assuming that all the signalling routes are congested.

FIG. 2 shows an example of the configuration of a signal processing system which is used as a signalling point (including a signalling end point and a signalling transfer point) in a signalling network. The signal processing system shown employs a multiprocessor configuration comprising a plurality of signal processors to distribute the load of signal processing. In FIG. 2, reference numeral 100 is a main processor (MPR), 110 and 111 are signal processors (SPRs), 120 and 121 are common channel signalling equipments (CSEs), 130 and 131 are digital terminals (DTs), 140, 141, 142, and 143 are signalling links (SLs), 150 is a network, and 160 and 161 are link sets (LSs). The link sets 160 and 161 each consist of a plurality of signalling links 140 and 141 or 142 and 143, respectively, each connected to a different destination signalling point.

Signalling link congestion control performed in this signal processing system will be described below. The common channel signalling equipments 120 and 121 each monitor the amount of signalling traffic being sent out on their associated signalling links 140 and 142 or 141 and 143, respectively. Suppose, for example, that the common channel signalling equipment 120 has detected that a large amount of signalling traffic (1) is deposited onto the signalling link 142. Then, a congestion event (2), indicating that congestion is occurring on the signalling link 142, is reported to the signal processor 110. If the congestion event (2) is received continuously, the signal processor 110 determines that the signalling link 142 is in a congested condition, and performs traffic control (3) to limit the signalling traffic to be sent out on the signalling link 142. This traffic control is applied to all the signalling links contained in the link set 161, that is, not only to the signalling link 142 but also to the signalling link 143. As a result, the signalling traffic to be sent out on the signalling link 143, as well as that on the signalling link 142, is restricted.

The above congestion control method has the problem that appropriate congestion control cannot be done, as will be described below.

(1) Signalling link congestion control in the signal processing system is performed by the common channel signalling equipment CSE monitoring the signalling traffic being sent out on its associated signalling links, and thereby detecting signalling link congestion. On the other hand, in the signal processor accommodating the common channel signalling equipment, congestion due to logical processing (software) that does not involve signal transmission can occur, such as congestion due to overloading of the central controller (CC), and in the case of such congestion, transmission of signalling traffic must be controlled. However, with the prior art congestion control method, such congestion due to logical processing (software) cannot be detected.

(2) Even when congestion has occurred on a signalling link, another signalling link in its associated link set may have capacity that can carry the signalling traffic originally intended on the congested signalling link. In that case, such a signalling link can be used as a substitute for the congested signalling link, and there is no need to restrict signalling traffic on other signalling links. However, with the prior art method, if congestion occurs on one signalling link, signalling traffic control is enforced on all the signalling routes defined on the associated link set by assuming that all the signalling routes are congested, thus restricting traffic on all other signalling routes on which signalling control need not be enforced, and hence, overly performing signalling traffic control in the signalling network. As a result, the resources in the signal processing system as well as in the signalling network are not utilized efficiently.

SUMMARY OF THE INVENTION

It is accordingly an object of the present invention to enable the resources in the signal processing system as well as in the signalling network to be utilized efficiently by monitoring the operating conditions of signal processors and by suppressing the use of affected signalling links within a congested processor.

According to the present invention, there is provided a method of controlling traffic congestion on a signalling link in a signalling network that comprises a plurality of signalling points connected to each other by a link set consisting of a plurality of signalling links, the method comprising the steps of: assigning a priority value to each of signalling links; determining a congestion-condition level; and enforcing traffic control on a signalling link whose priority value is lower than a priority value corresponding to the determined congestion-condition level.

According to the present invention, there is also provided an apparatus for controlling traffic congestion on a signalling link in a signalling network that comprises a plurality of signalling points connected to each other by a link set consisting of a plurality of signalling links, the apparatus comprising: means for storing a priority value for each of the signalling links; means for determining a congestion-condition level; and means for enforcing traffic control on a signalling link whose priority value is lower than a priority value corresponding to the determined congestion-condition level.

BRIEF DESCRIPTION OF THE DRAWINGS

FIG. 5 is a diagram showing an example of how processed signal count threshold is determined;

FIG. 6 is a diagram showing an example of how overload condition threshold is determined;

FIG. 8 is a diagram showing an example of the assignment of signalling link priority information;

FIG. 9 is a diagram showing the format of signals transferred to and from a signalling link use-inhibit control section;

FIG. 10 is a diagram showing a signalling sequence between signalling points according to the congestion control of the present invention;

DESCRIPTION OF THE PREFERRED EMBODIMENTS

The preferred embodiments of the present invention will be described below with reference to the accompanying drawings.

Figure 1:
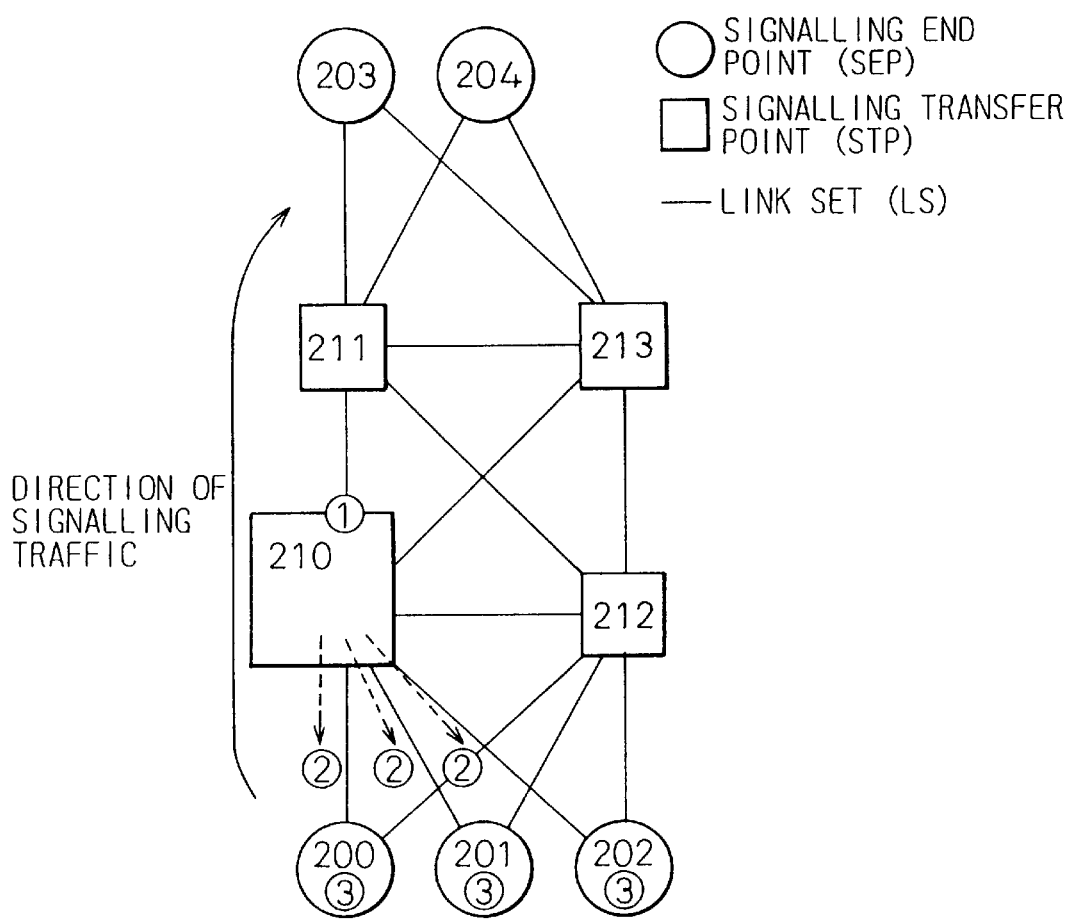
FIG. 1 is a diagram for explaining prior art congestion control in a signalling network of a common channel signalling system.
Figure 2:
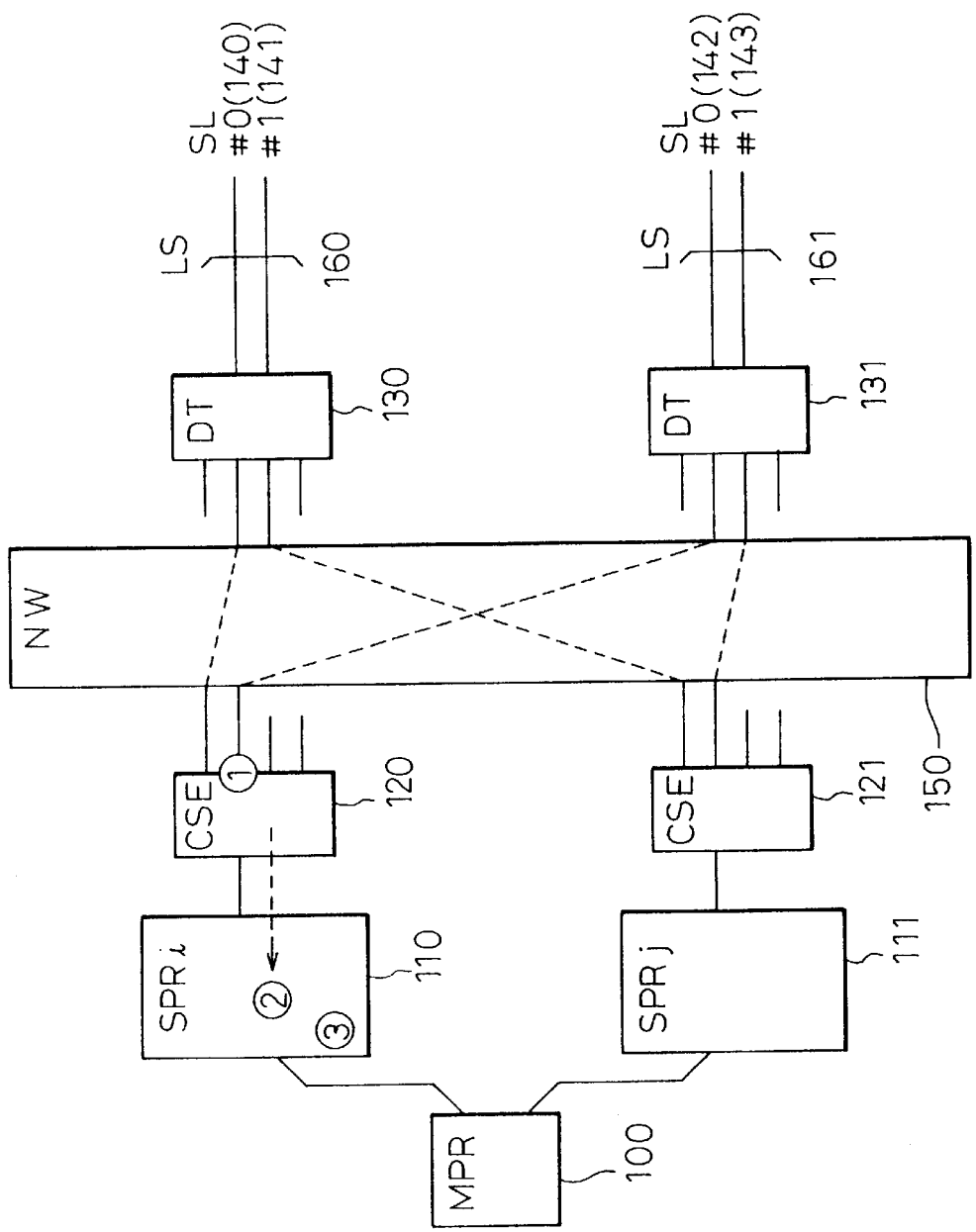
FIG. 2 is a diagram for explaining the prior art congestion control in a signal processing system configuration.
Figure 3:
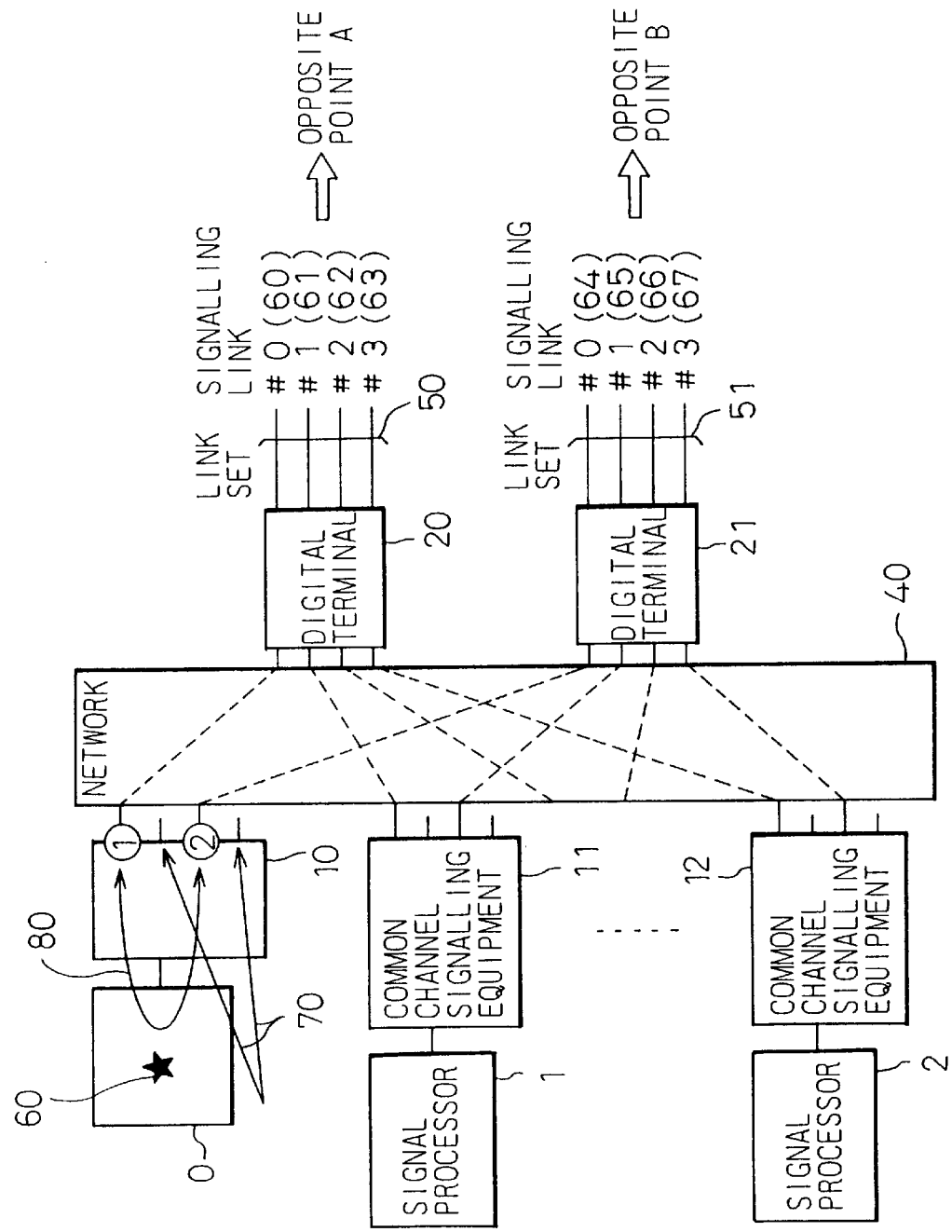
FIG. 3 is a block diagram of a signal processing system according to one embodiment of the present invention.

FIG. 3 shows a signal processing system according to one embodiment of the present invention. In FIG. 3, reference numerals 0, 1, and 2 are signal processors; 10, 11, and 12 are common channel signalling equipments; 20 and 21 are digital terminals; 60 to 67 are signalling links; 40 is a network; and 50 and 51 are link sets.

The signalling links are predefined in a one-to-one correspondence with the terminals on the common channel signalling equipments 10 to 12, and are formed by being connected to the respective data links on the digital terminals 20 and 21 via the network 40 within the system. The link sets 50 and 51 are each formed from a plurality of signalling links that are predefined on different common channel signalling equipments associated with different signal processors. In the illustrated signal processing system, the load of outgoing signalling traffic is distributed over the plurality of signalling links within link sets.

In each signal processor, if a congested condition 60 is detected, congestion priority 70 assigned to each signalling link is referred to, and a use-inhibiting procedure is invoked according to the congestion-condition level of the signal processor, to limit the number of signalling links available for use on that signal processor.

Figure 4:
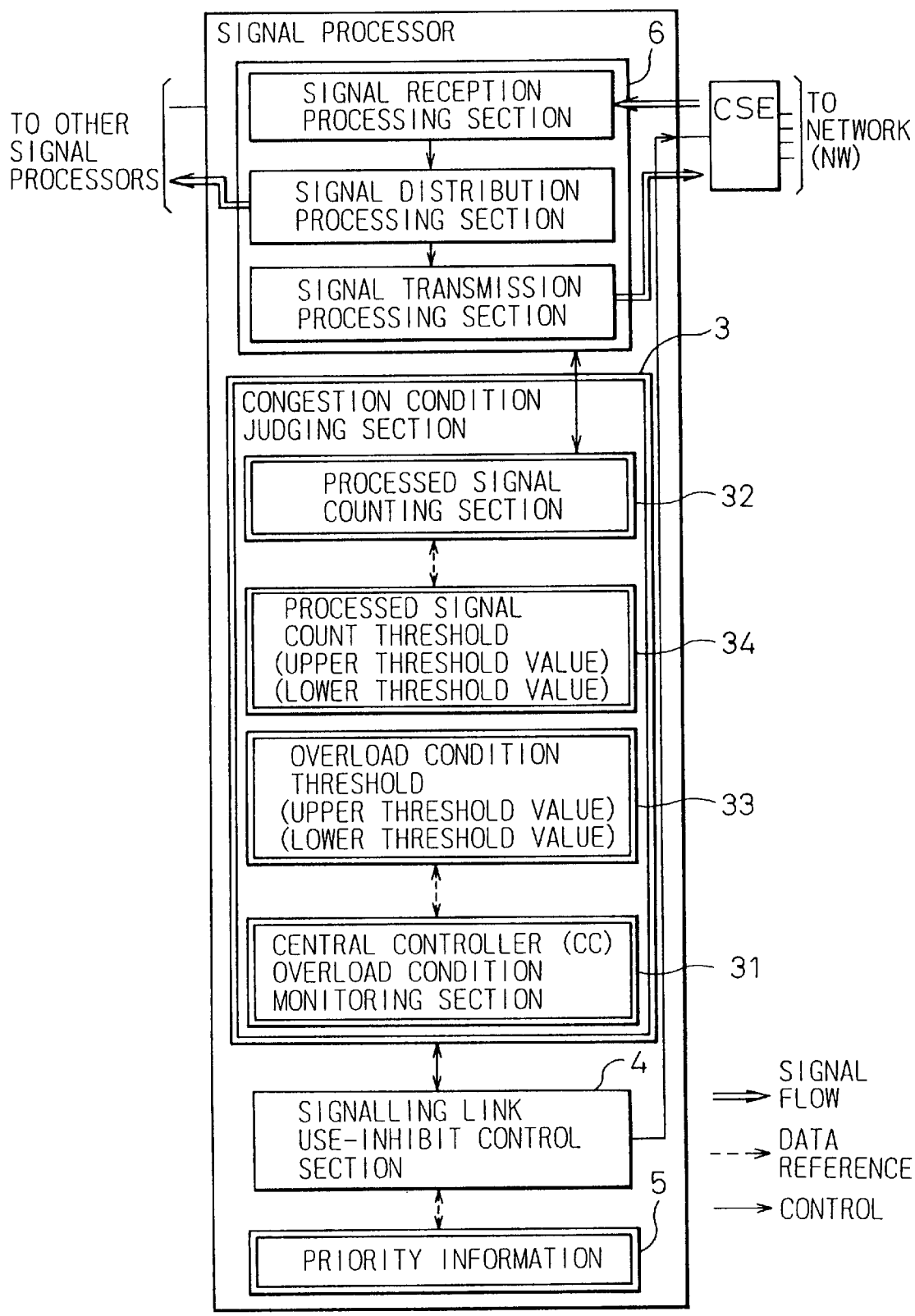
FIG. 4 is a functional block diagram of a signal processor according to the one embodiment of the present invention.

FIG. 4 is a functional block diagram of the signal processors 0 to 2, showing the configuration related to congestion condition monitoring processing. As shown, each signal processor consists essentially of a congestion condition judging section 3, a use-inhibit control section 4 for performing use-inhibiting control by referring to priority information 5, and a transmit/receive section 6. The congestion condition judging section 3 consists essentially of a central controller overload condition monitoring section 31 for judging the condition of congestion by referring to a overload condition threshold 33, and a processed signal counting section 32 for judging the condition of congestion by referring to a processed signal count threshold 34.

In this signal processor, the congestion condition judging section 3 is provided as a means for controlling the congestion condition of the signal processor, over and above the means for monitoring signalling traffic as implemented by the common channel signalling equipment CSE in the prior art. The congestion condition judging section 3 comprises, as described above, the overload condition monitoring section 31 which monitors the overload condition of the central controller (CC) at predetermined intervals of time, and the processed signal counting section 32 which classifies the signals to be processed according to their types and repeatedly counts the number of processed signals of each type for a predetermined period of time. Each section judges that the signal processor is in a congested condition if a threshold (an upper threshold value) predetermined for each section is exceeded. Further, each section judges that the signal processor is in a congestion cleared condition if a threshold (a lower threshold value) predetermined for each section separately from the upper threshold value is exceeded in the negative sense.

FIG. 5 shows an example of how the processed signal count threshold 34 is determined for processed signal counting. The processed signal count threshold 34 is used to determine the presence or absence of congestion based on the number of signals (count value) processed in the signal processor. The upper and lower threshold values are set for each signal processing type. Since the signal processing load differs depending on the type of signal processing (i.e., what processing is performed), the upper and lower threshold values are different for different types, and this difference is represented by a logical comparison coefficient. For example, when the logical comparison coefficient is 1 for type A and 3 for type B, this means that the upper and lower threshold values for type B are respectively one-third of the upper and lower values for type A. In the example shown, in the case of signal processing of type A, for example, if the processed signal count value exceeds 6000, it is judged that congestion has occurred, and if the count value drops to 4500 or less after the occurrence of congestion, it is determined that the congestion is cleared.

FIG. 6 shows an example of how the overload condition threshold 33 is determined for central controller overload condition monitoring. As shown, the overload condition threshold 33 is set for each signal processor, the upper and lower threshold values being defined as a percentage of the processor load. For example, in the case of the signal processor SPR1, the upper threshold value is 80% and the lower threshold value is 50%; therefore, if the load of the processor SPR1 exceeds 80%, it is judged that the processor SPR1 is overloaded, and if, thereafter, the load drops to 50% or less, it is judged that the overloaded condition is cleared.

Figure 7:
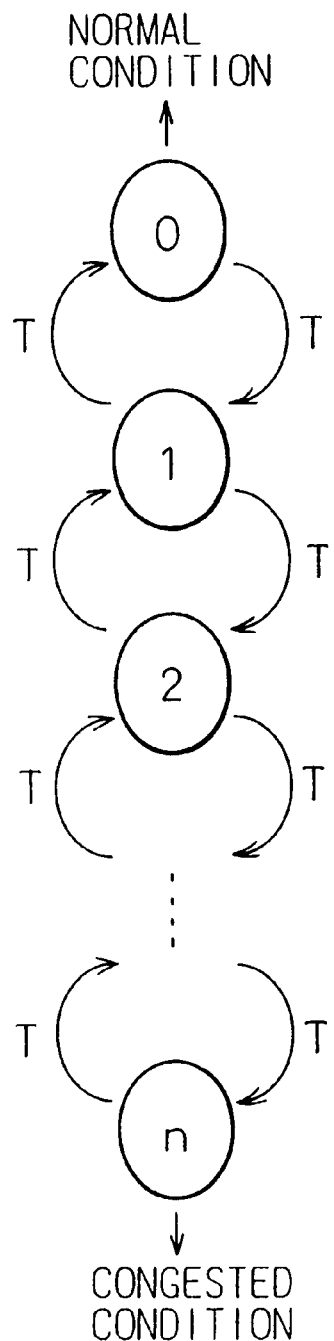
FIG. 7 is a transition diagram of a congestion-condition level of the signal processor.

The congestion condition of each signal processor is represented by multiple congestion-condition levels. The congestion condition (the overload condition of the CC or the number of processed signals) is judged at regular intervals of time, and the congestion-condition level is updated in accordance with the result of the judgement. FIG. 7 shows the transition of the congestion-condition level of the signal processor. The congestion-condition level "0" is the lowest congestion level. The presence or absence of congestion in the signal processor is judged for each cycle of processor congestion condition judging period T, and if it is judged that there is congestion, the congestion-condition level is updated to "1". If it is judged in the next cycle of judging period T that there still is congestion, the congestion-condition level is updated to "2". The updating is repeated until the highest congestion level n is reached. On the other hand, when the current congestion-condition level is "2", for example, if it is judged in the next cycle of judging period T that the congestion is cleared, then the congestion-condition level is updated to "1", and if it is judged in the further subsequent cycle of judging period T that the congestion is cleared, the congestion-condition level is updated to "0", which means there is no congestion.

On the other hand, priority is assigned to each signalling link accommodated in the signal processing system, based on the signalling characteristics (relative amount of signalling traffic, type, etc.) of the signalling link, and is stored as priority information 5, to which the congestion-condition levels correspond.

FIG. 8 shows an example of the assignment of the signalling link priority information 5. The priority information 5 represents priority attached to each signalling link, and when performing signalling link use-inhibiting control, control is enforced in sequence in order of increasing priority, the lowest-priority signalling link first, in accordance with the congestion-condition level, thus accomplishing multi-stage implementation of the signalling link use-inhibiting control. As shown, priority data is given to each signalling link number. There are n priority levels from 1 to n, the highest priority being n.

Based on the result of the signal processor congestion condition monitoring in the congestion condition judging section 3 and on the signalling link priority information 5, if it is judged that the signal processor is in a congested condition, the signalling link use-inhibit control section 4 performs a use-inhibiting procedure on signalling links accommodated in the signal processor and whose priority is equal to or lower than the congestion-condition level. Thereafter, the use of such signalling links is inhibited for signalling data transmission.

Once the use is inhibited by the use-inhibiting procedure, each of the inhibited signalling link remains in the inhibited condition until the congestion condition of the signal processor falls back to a congestion-condition level lower than the priority level of the signalling link.

The use-inhibiting procedure performed in the use-inhibit control section 4 is to temporarily inhibit a designated signalling link from being used for signalling data transmission in the signal processing systems connected at both ends of the signalling link. Depositing signalling traffic on the inhibited signalling link is inhibited at the signal originating point. The inhibited signalling link is replaced by an alternate signalling link within the associated link set, and the originating point outputs signalling data, originally intended for transmission over the inhibited signalling link, onto the alternate signalling link. The associated link set means the same link set or some other link set that can be used as a substitute when the alternate signalling link is not available within the same link set.

Inhibiting a signalling link is allowed only when communication with signal destination points can be maintained even if the use of the signalling link is inhibited in the signal processing systems at both ends of the signalling link. When such communication conditions cannot be maintained, that is, when any one of the signal destination points is expected to become unable to communicate if the use of the signalling link is inhibited, the request for inhibiting the signalling link is rejected.

For the inhibited signalling link, when the congestion-condition level in the signal processing system at one end of the signalling link has fallen back to a level lower than the priority assigned to the signalling link, a clear request signal (or a forced clear request signal) is issued to the signal processing system at the other end. In the signal processing system that received the signal, if the congestion-condition level is lower than the priority level of that signalling link, then the use-inhibited condition is cleared for the signalling link. Further, in the signal processing systems at both ends of the inhibited signalling link, if a signal destination point that has been operating for communication has become unable to communicate due, for example, to a failure of some other signalling link, and if the signalling route to the signal destination point contains that inhibited signalling link, then the use-inhibited condition is automatically cleared in order to maintain the communication with the signal destination point.

By performing the use-inhibiting procedure successively in accordance with the multiple congestion-condition levels, as congestion occurs in a signal processor within the signal processing system, the number of openable signalling links accommodated in the signal processor is limited in accordance with the congestion-condition level, and at the same time, overflow signalling traffic is rerouted over signalling links accommodated in other processors. In this way, the congestion condition of the signal processor is alleviated, while efficiently utilizing the resources within the signal processing system.

Furthermore, since overflow signalling traffic is distributed over other signalling links at both ends of the inhibited signalling link, no restrictions are imposed on the absolute amount of signalling traffic in the signalling network. This prevents local congestion from spreading globally throughout the signalling network.

FIG. 9 shows the format of various signals transferred to and from the signalling link use-inhibit control section. This signal format conforms to the one generally used in the Common Channel Signalling System No. 7.

Referring now to FIG. 10, we will describe a signalling sequence between two signalling points according to the signalling point congestion control method of the invention. Consider a case where a signal processor SPRi is judged to be in a congested condition, and the congestion-condition level is updated from 1 to 2. Then, the use-inhibiting procedure is performed on signalling links accommodated in the signal processor SPRi and whose priority level is "2" or lower (*1). More specifically, an inhibit request signal, requesting for inhibiting the use of signalling links with priority "2" or lower, is sent to a neighboring point which, in response, returns an inhibit-request acknowledge signal if it grants the inhibit request.

With this use-inhibiting procedure, signalling traffic is not sent out on the inhibited signalling links (*3). In the illustrated example, the use of signalling links with priority 2 or lower is inhibited, and therefore, signalling traffic is not sent out on these signalling links.

When it is judged that the congestion condition of SPRi is cleared, and the congestion-condition level falls back from "2" to "1", of the inhibited signalling links in the signal processor SPRi the signalling links with priority "2" or higher are subjected to a use-inhibit clearing procedure (*2). More specifically, a clear request signal, requesting for clearing the use-inhibited condition for the signalling links with priority "2" or higher, is sent to the neighboring point which, in response, returns a clear-request acknowledge signal, after which the use-inhibited condition is cleared.

Figure 11:
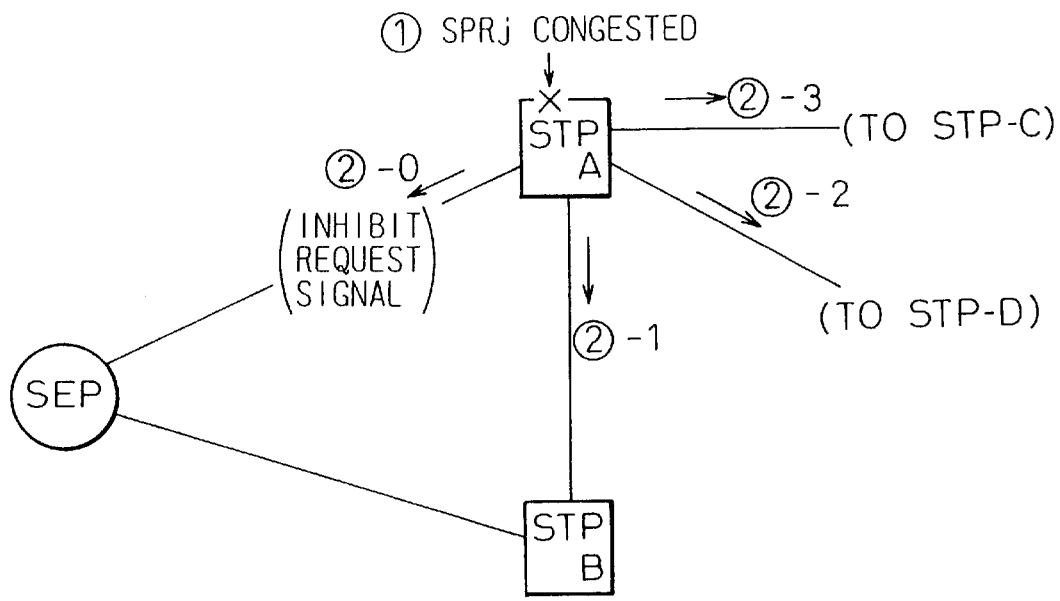
FIGS. 11 and 12 are diagrams each showing a control sequence within a signalling network.

Next, referring to FIG. 11, we will describe a control sequence within the signalling network when the use-inhibiting procedure is performed.

(1) Congestion occurs in signal processor SPRj at signalling transfer point A.

(2) The use-inhibiting procedure is performed on signalling links accommodated in the signal processor SPRj, and an inhibit request signal is sent to neighboring points. The use of the following signalling links is inhibited.

(2)-0; signalling link between signalling transfer point A and signalling end point (SEP)

(2)-1; signalling link between signalling transfer point A and signalling transfer point B (2)-2; signalling link between signalling transfer point A and signalling transfer point D (2)-3; signalling link between signalling transfer point A and signalling transfer point C (3) The neighboring points (the signalling end point SEP and the signalling transfer points B, C, and D) of the signalling transfer point A send the signalling traffic, which is originally intended on the inhibited signalling links and which is directed to the signalling transfer point A, out onto other signalling links.

(4) The signalling transfer point A transmits over other signalling links than the inhibited links.

Figure 12:
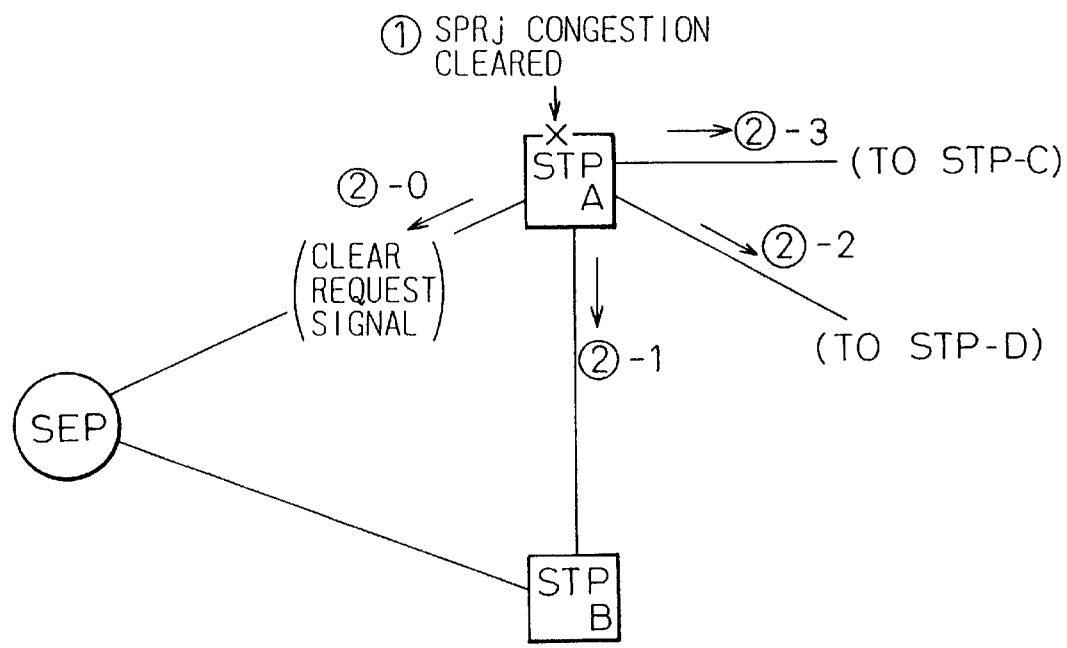

Referring next to FIG. 12, we will describe a control sequence within the signalling network when the use-inhibit clearing procedure is performed.

(1) At signalling transfer point A, the congestion condition of the signal processor SPRj is cleared.

(2) The use-inhibit clearing procedure is performed on the inhibited signalling links accommodated in the signal processor SPRj, and a clear request signal is sent to the neighboring points. The use-inhibited condition of the following signalling links is cleared.

(2)-0; signalling link between signalling transfer point A and signalling end point (SEP)

(2)-1; signalling link between signalling transfer point A and signalling transfer point B (2)-2; signalling link between signalling transfer point A and signalling transfer point D (2)-3; signalling link between signalling transfer point A and signalling transfer point C (3) The neighboring points (the signalling end point SEP and the signalling transfer points B, C, and D) of the signalling transfer point A transfer the signalling traffic, being rerouted over other signalling links, out onto the originally intended signalling links for which the inhibit condition has been cleared.

(4) The signalling transfer point A transfers the signalling traffic, being rerouted over other signalling links, out onto the originally intended signalling links for which the inhibit condition has been cleared.

The various processing procedures performed within the signal processor will be described below with reference to the flowcharts of FIGS. 13 to 18.

Figure 13:
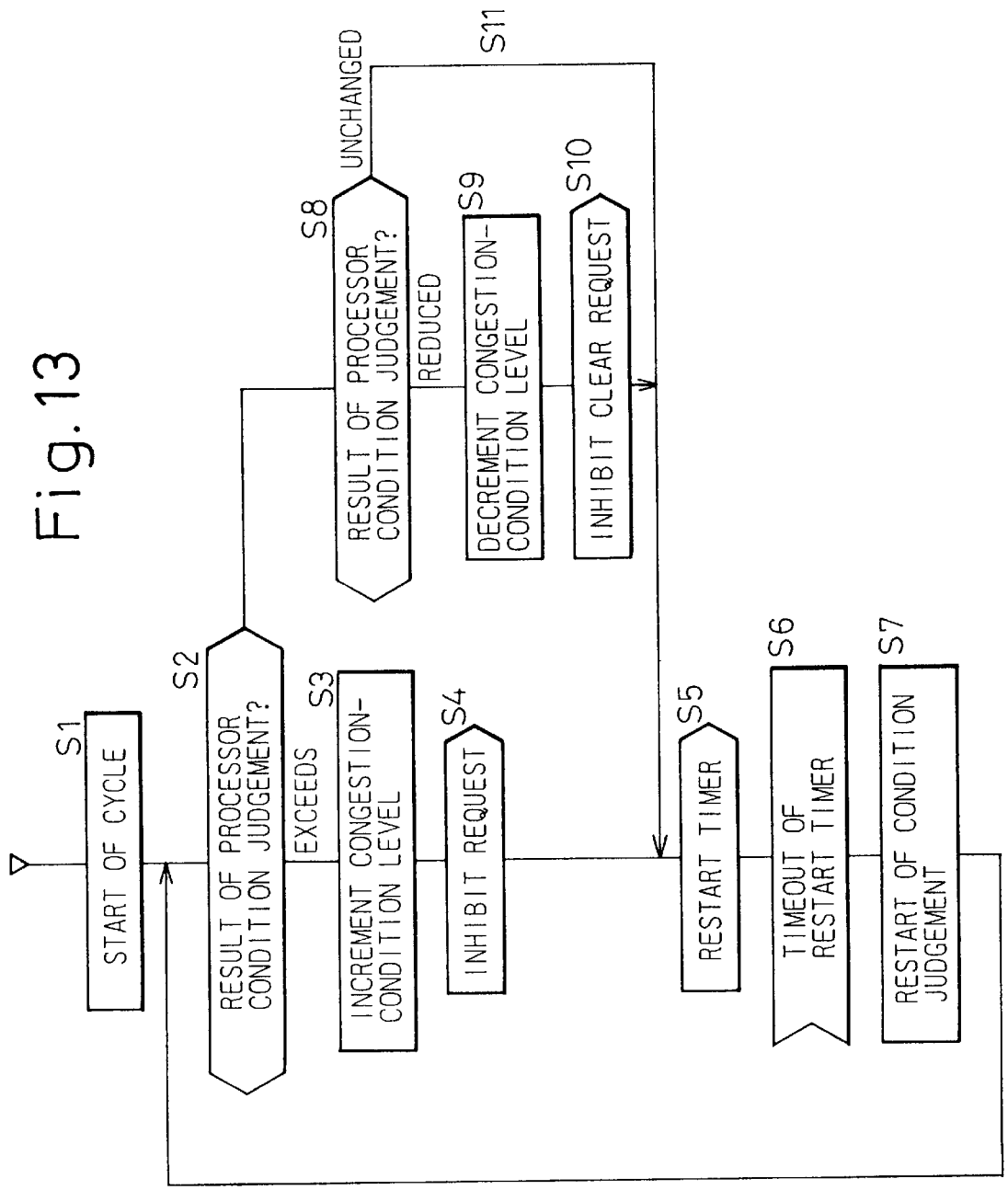
FIG. 13 is a flowchart illustrating the processing performed in a congestion condition judging section.

First, the processing procedure in the congestion condition judging section 3 will be described with reference to FIG. 13.

In the congestion condition judging section 3, a cycle for monitoring the congestion condition of the signal processor is initiated (step SI). The congestion condition judging section 3 judges the congestion condition of the signal processor on the basis of the results supplied from the processed signal counting section 32 and the central controller overload condition monitoring section 31 (step S2). More specifically, if the number of processed signals classified and counted by the processed signal counting section 32 exceeds its upper threshold value, or if the overload condition monitored by the central controller overload condition monitoring section 31 exceeds its upper threshold value, then it is judged that the signal processor is in a congested condition (step S2). If it is not in a congested condition, the count value and the overload condition are compared with their respective lower threshold values to judge whether the processor is in a reduced load condition or in an unchanged condition (step S8). This judging process will be described in detail later.

If it is judged that the processor is in a congested condition, the congestion-condition level of the processor is incremented by 1 (step S3), an inhibit request appropriate to the incremented congestion-condition level is issued to the signalling link use-inhibit control section 4 (step S4), and a restart timer is activated for the next cycle of congestion condition judgement (step S5). Upon timeout of the restart timer (step S6), the next cycle of congestion condition judgement is started (step S7).

If both results show that the processor is in a reduced load condition, then the congestion-condition level is decremented by 1 (step S9), an inhibit clear request appropriate to the decremented congestion-condition level is issued (step S10), and the next cycle of congestion condition judgement is started following the processing sequence in steps S5 to S7.

Figure 14:
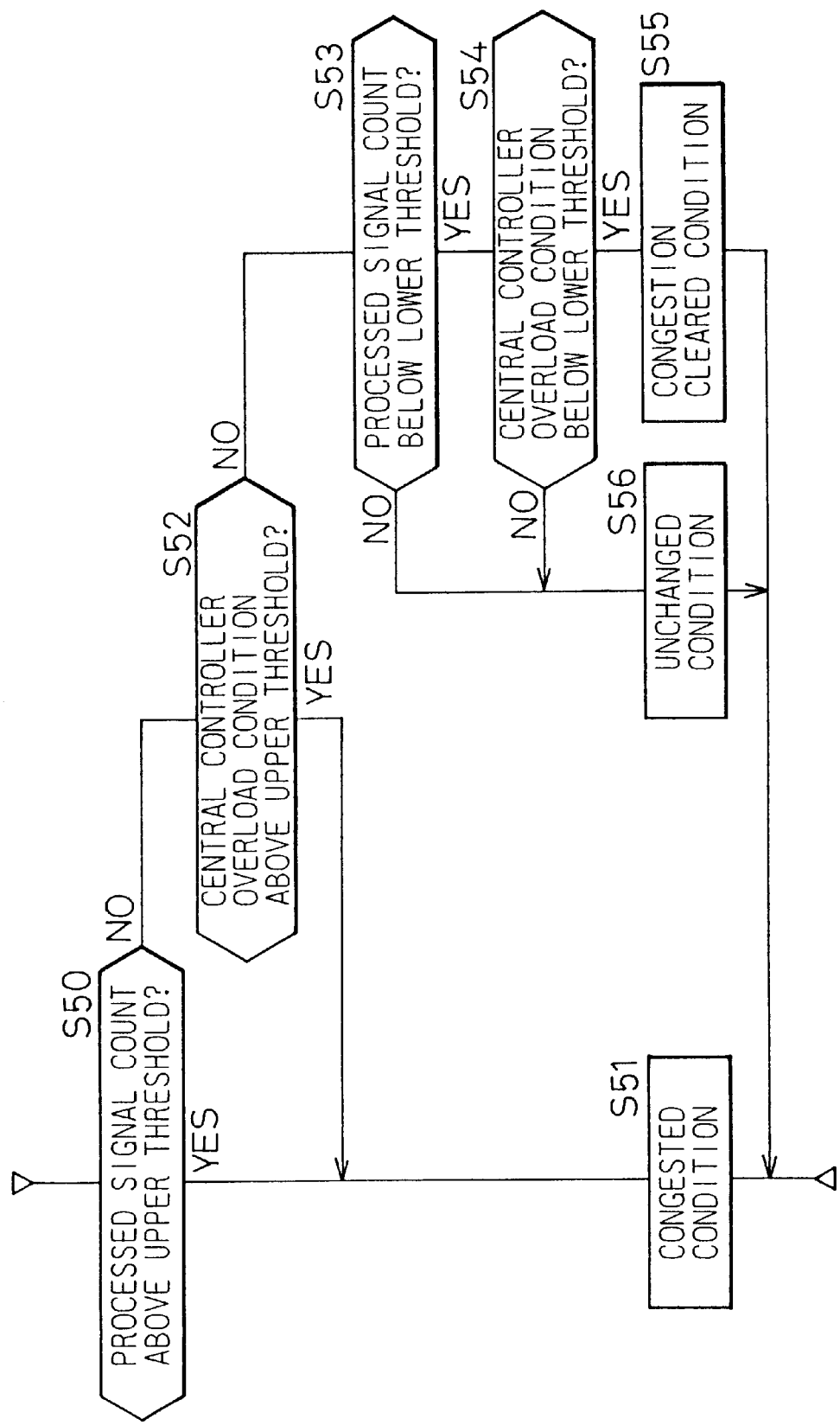
FIG. 14 is a flowchart illustrating the details of a processor condition judging process.

FIG. 14 is a flowchart illustrating in detail the processing performed in steps S2 and S8 for judging the processor condition in the above processing flow. First, it is judged whether the number of processed signals counted by the processed signal counting section 32 for each type of signal processing is above its upper threshold value (step S50), and if there is a signal count value that has exceeded its upper threshold value, it is judged that the signal processor is in a congested condition (resulting in incrementing the processor congestion-condition level) (step S51). If there are no signal counts that exceed the upper threshold value, then it is judged whether the overload condition monitored by the central controller overload condition monitoring section 31 is above its upper threshold value (step S52), and if the answer is YES, it is judged that the signal processor is in a congested condition (step S51).

If neither the processed signal count nor the overload condition of the central controller exceeds their respective upper threshold values, then it is judged whether the processed signal count for each type of signal processing is below its lower threshold value (step S53). If the answer is YES, it is further judged whether the overload condition monitored by the central controller overload condition monitoring section 31 has dropped below its lower threshold value (step S54), and if the answer is YES, it is judged that the signal processor is in a congestion cleared condition (resulting in decrementing the congestion-condition level of the processor) (step S55).

On the other hand, if either the processed signal count or the overload condition of the central controller is above the lower threshold value, it is judged that the signal processor is in an unchanged condition (the congestion-condition level of the processor remains unchanged) (step S56).

Figure 15:
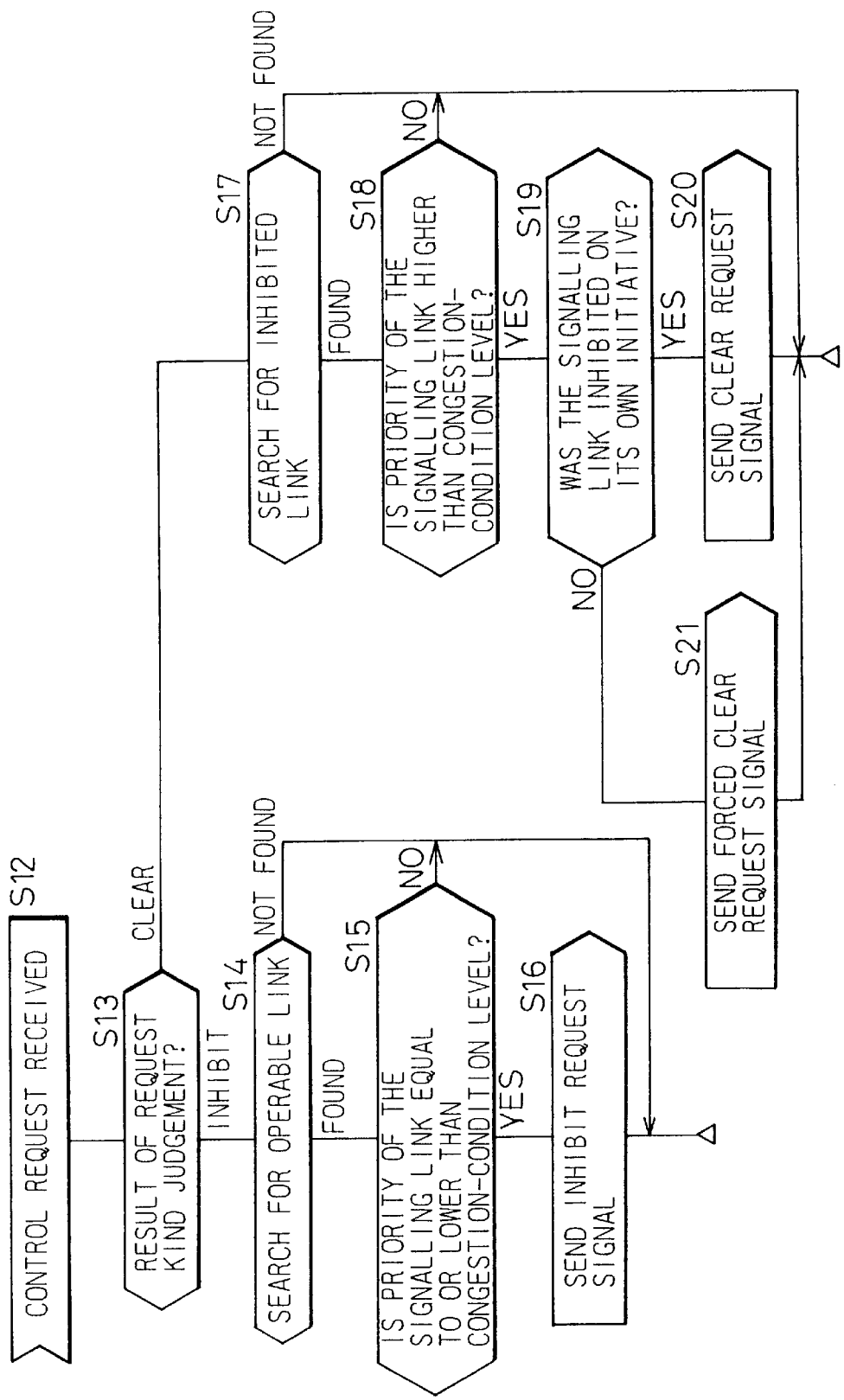
FIG. 15 is a flowchart illustrating the processing performed in the signalling link use-inhibit control section when a control request is received.

Next, referring to FIG. 15, we will describe the processing performed by the signalling link use-inhibit control section 4 when a control request is received. In the signalling link use-inhibit control section 4, when a control request from the congestion condition judging section 3 is received (step S12), the kind of the control request, i.e., an inhibit request or an inhibit clear request, is judged (step S13).

If the control request is an inhibit request, a search is made for a signalling link in an operable condition (step S14), and if an operable signalling link is found, then it is judged whether the priority of the signalling link is equal to or lower than the congestion-condition level (step S15). If the priority of the signalling link is equal to or lower than the congestion-condition level, an inhibit request signal is sent to the destination point connected at the other end of the signalling link (step S16).

If there is no operable signalling link, or if the priority of the operable signalling link is higher than the congestion-condition level, the process is terminated.

If the control request is an inhibit clear request (step S13), a search is made for an inhibited signalling link (step S17), and if an inhibited signalling link is found, then it is judged whether the priority of the signalling link is higher than the congestion-condition level (step S18). If the priority of the signalling link is higher than the congestion-condition level, then it is judged whether that signalling link was inhibited on its own initiative, and if so, an inhibit clear request signal is sent to the destination point connected at the other end of the signalling link (step S20); otherwise, a forced inhibit clear request signal is sent to the destination point connected at the other end of the signalling link (step S21).

If there is no inhibited signalling link, or if the priority of the inhibited signalling link is not higher than the congestion-condition level, the process is terminated.

Figure 16:
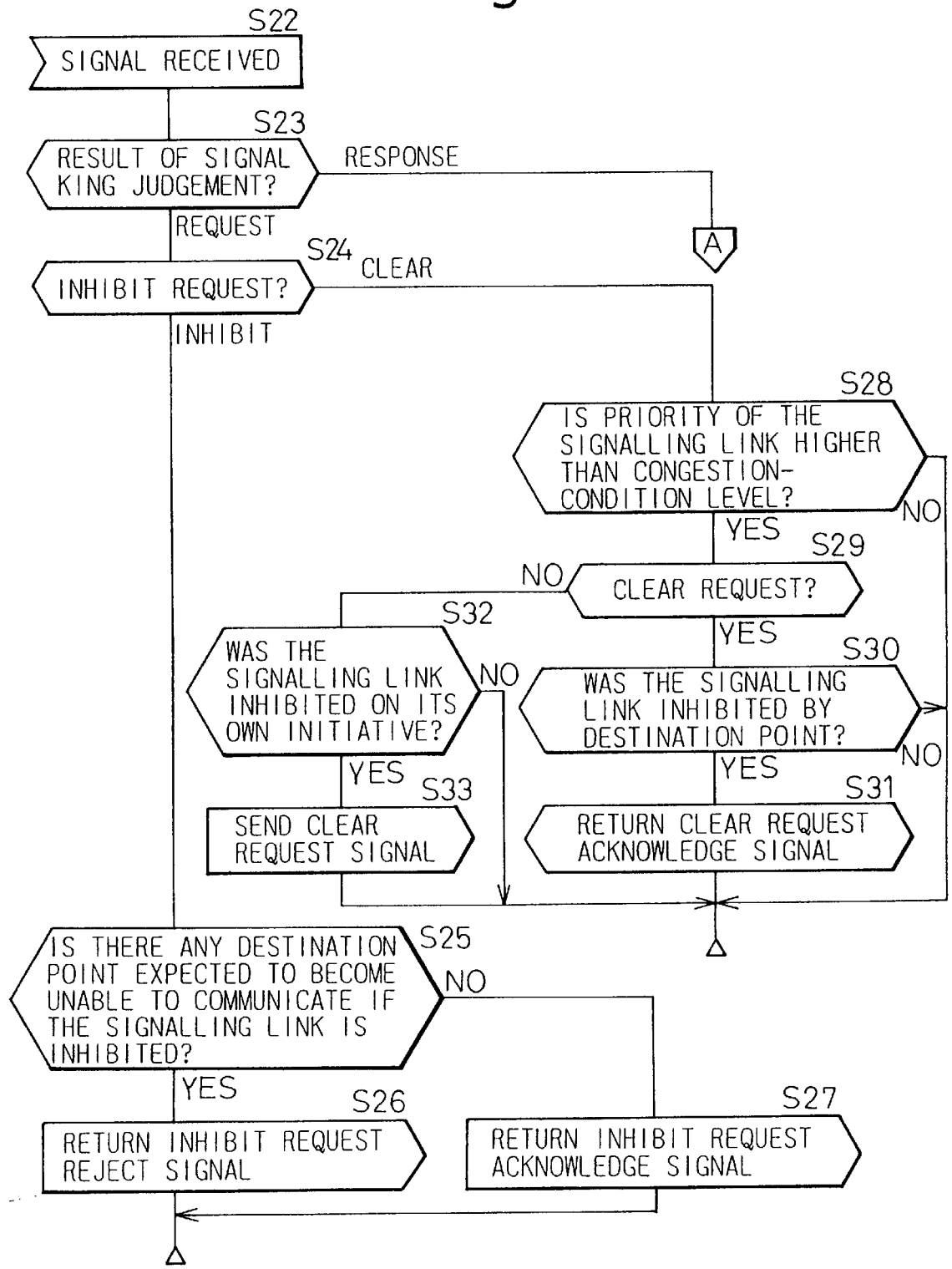
FIGS. 16 and 17 is a flowchart illustrating the processing performed in the signalling link use-inhibit control section when a signal is received.
Figure 17:
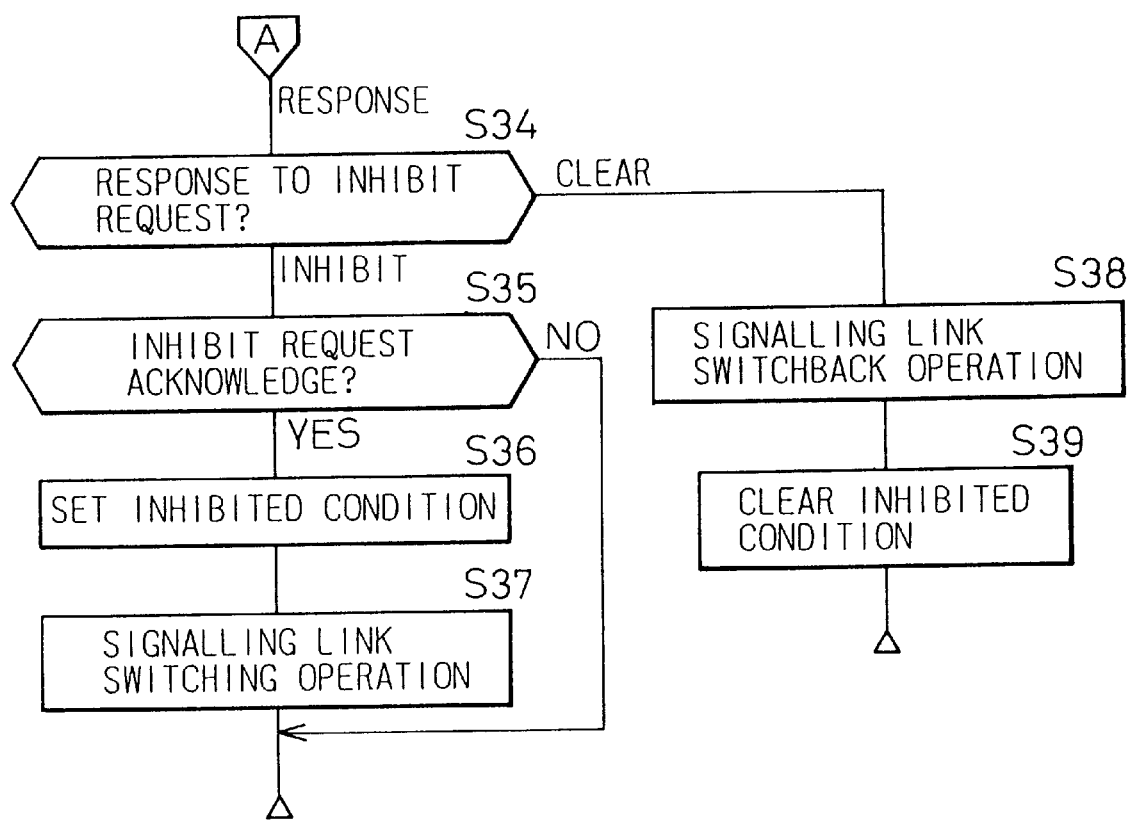

Referring next to FIGS. 16 and 17, we will describe the processing performed by the signalling link use-inhibit control section 4 in the signal processor when a signal is received. In the signalling link use-inhibit control section 4, when a signal from a destination point is received (step S22), the kind of the received signal, i.e., a request signal or a response signal, is judged (step S23).

If the received signal is a request signal, it is judged whether the request signal concerns an inhibit request or a clear request (or a forced clear request) (step S24). If the request signal is an inhibit request signal, then it is judged whether there is any destination point that will become unable to communicate if the use of the applicable signalling link is inhibited (step S25). If there is such a destination point, an inhibit request reject signal is returned to the requesting destination point (step S26). On the other hand, if there is no destination point that will become unable to communicate, an inhibit request acknowledge signal is returned to the requesting destination point (step S27).

If the request signal is a clear request signal (or a forced clear request signal) (step S24), it is judged whether or not the priority of the applicable signalling link is higher than the congestion-condition level (step S28), and if the priority of the signalling link is higher than the congestion-condition level, then it is judged whether the clear request is a clear request signal or a forced clear request signal (step S29).

If the clear request is a clear request signal (step S29), it is judged whether that signalling link was inhibited by the destination point (step S30), and if so, a clear request acknowledge signal is returned to the requesting destination point (step S31).

If the clear request is a forced clear request signal (step S29), it is judged whether that signalling link was inhibited on its own initiative (step S32), and if so, a clear request signal is sent to the destination point connected at the other end of the signalling link (step S33).

If the received signal is a response signal (step S23), it is judged whether the response signal is for an inhibit request signal or for a clear request signal (step S34). If the response signal is for an inhibit request signal, then it is judged whether the response signal is an inhibit request acknowledge signal or an inhibit request reject signal (step S35). If it is an inhibit request acknowledge signal, a setting is made to inhibit the use of the applicable signalling link (step S37), and a signalling link switching operation is performed (step S37). With this switching operation, signalling traffic intended on the signalling link is rerouted over an alternate signalling link.

On the other hand, if the response signal is for a clear request signal (step S34), a signalling link switchback operation is performed (step 38). With this switchback operation, signalling traffic that has been rerouted over an alternate signalling link is now directed over the applicable signalling link. Following the switchback operation, the use-inhibited condition of that signalling link is cleared (step S39).

Figure 18:
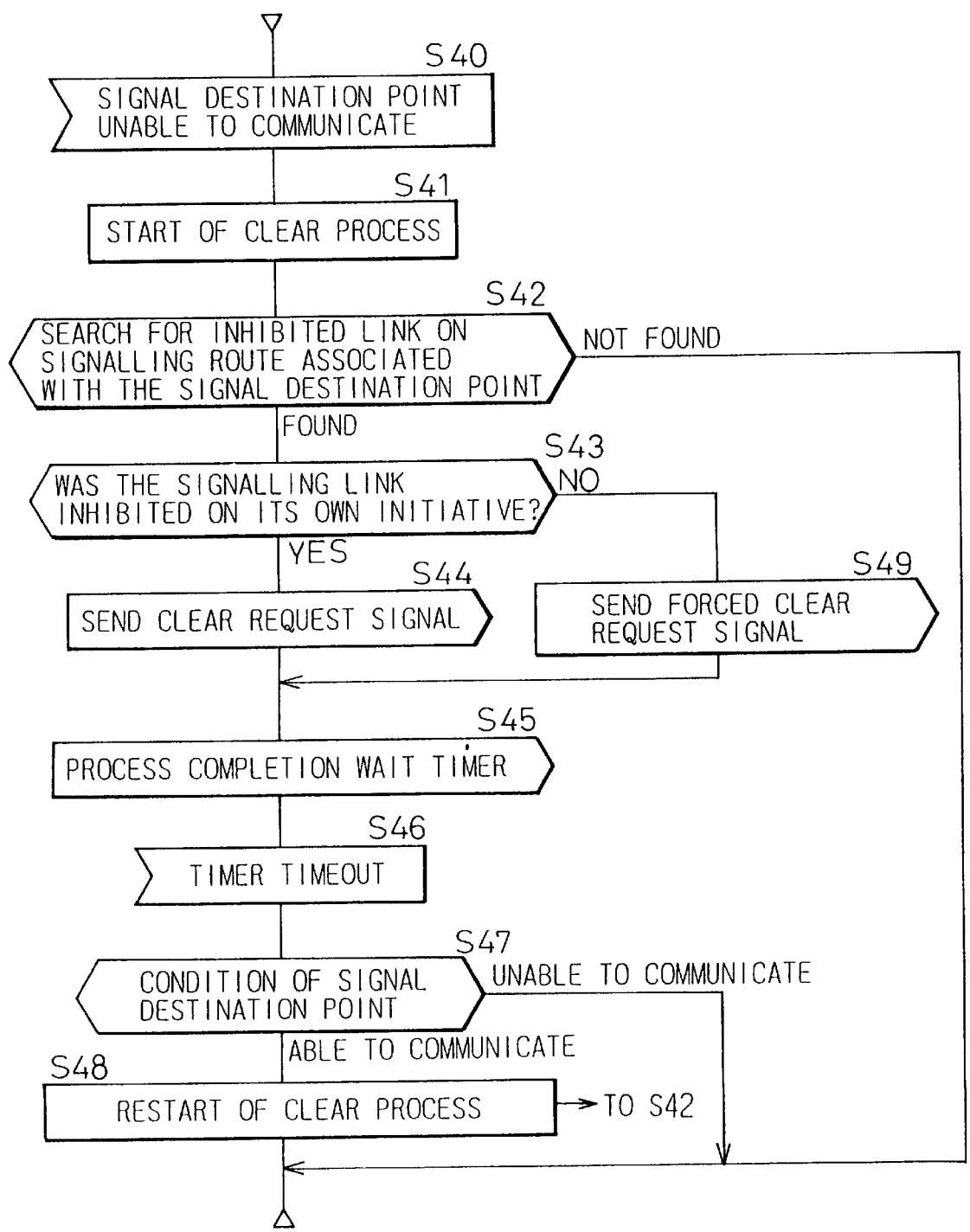
FIG. 18 is a flowchart illustrating the processing performed in the signalling link use-inhibit control section when a signal destination point has become unable to communicate.

Referring now to FIG. 18, we will describe the processing performed by the signalling link use-inhibit control section 4 in the signal processor when a signal is received indicating that a signal destination point has become unable to communicate. In the signalling link use-inhibit control section 4, when a signal is received indicating that a signal destination point has become unable to communicate (step S40), an inhibited condition clear process is invoked in order to recover an inhibited signalling link (step S41).

A search is made for an inhibited signalling link on the signalling route related to the signal destination point that has become unable to communicate (step S42), and if an inhibited signalling link is found, it is judged whether that signalling link was inhibited on its own initiative (step S43), and if so, a clear request signal is sent to the destination point connected at the other end of the signalling link (step S44). On the other hand, if that signalling link was inhibited by the destination point, a forced clear request signal is sent to the destination point connected at the other end of the signalling link (step S49).

After that, a clear process completion wait timer is activated (step S45), and upon timeout of the clear process completion wait timer (step S46), it is judged whether the signal destination point is able to communicate (step S47);

if it is still unable to communicate, the clear process is performed once again by following the sequence starting from step S42 (step S48).

We claim:

1. A method of controlling traffic congestion on a signaling link in a signaling network including a plurality of signaling points connected to each other by a link set having a plurality of signaling links, the method comprising the steps
   a) assigning a priority value to each of the signaling links;
   b) determining a congestion-condition level; and
   c) enforcing traffic control on a signaling link whose priority value is lower than a priority value corresponding to the determined congestion-condition level,
   wherein each signaling point is equipped with a plurality of signal processors over which processing of traffic on signaling links connected to the signaling point is distributed, said signal processors operating in parallel with each other,
   in step b), the congestion-condition level is determined for each signal processor in each signaling point, and
   in step c), among the signaling links belonging to each signal processor, traffic control is enforced on a signaling link whose priority value is lower than the priority value corresponding to the congestion-condition level determined for the signal processor, wherein
   step b) includes the substeps of
      i) judging whether the signal processor is in a congested condition or in a congestion cleared condition;
      ii) raising the congestion-condition level when the signal processor is judged to be in the congested condition; and
      iii) lowering the congestion-condition level when the signal processor is judged to be in the congestion cleared condition, and wherein
         in substep i) of step b), the signal processor is judged to be in a congested condition, when one of count values of individual signal processing types of signals processed by the signal processor, is above an upper threshold value, or when an overload condition of a central controller for the signal processor is above an upper threshold value, and the signal processor is judged to be in the congestion cleared conditon, when all the count values are less than a lower threshold value, and when the overload condition is less than a lower threshold value.

2. A method according to claim 1, wherein
   in step c), the traffic control is enforced by inhibiting the use of the signalling link whose priority value is lower than the priority value corresponding to the congestion-condition level, and by substituting for the inhibited signalling link a signalling link belonging to another signal processor.

3. A method according to claim 2, wherein
   in step c), a request for inhibiting the use of the signalling link is rejected when there is a signalling point that is expected to become unable to communicate when the use of the signalling link is inhibited.

4. A method according to claim 2, wherein
   in step c), the inhibited signalling link is switched back into operation when there arises a signalling point that has become unable to communicate after the use of the signalling link is inhibited.

5. An apparatus for controlling traffic congestion on a signaling link in a signaling network including a plurality of signaling points connected to each other by a link set having a plurality of signaling links, the apparatus comprising:
   means for storing a priority value for each of the signaling links;
   means for determining a congestion-condition level; and
   means for enforcing traffic control on a signaling link whose priority value is lower than a priority value corresponding to the determined congestion-condition level,
   wherein each signaling point is equipped with a plurality of signal processors over which processing of traffic on signaling links connected to the signaling point is distributed, said signal processors operating in parallel with each other,
   the congestion-condition level determining means determines the congestion-condition level for each signal processor in each signaling point, and
   among the signaling links belonging to each signal processor, the control enforcing means enforces traffic control on a signaling link whose priority value is lower than the priority value corresponding to the congestion-condition level determined for the signal process, wherein
      the congestion-condition level determining means includes
      means for judging whether the signal processor is in a congested condition or in the congestion cleared condition;
      means for raising the congestion-condition level when the signal processor is judged to be in a congested condition; and
      means for lowering the congestion-condition level when the signal processor is judged to be in the congestion cleared condition, and wherein
      the judging means judges that the signal processor is in a congested condition, when one of count values of individual signal processing type of signals processed by the signal processor, is above an upper threshold value, or when an overload condition of a central controller for the signal processor is above an upper threshold value, and judges that the signal processor is in the congestion cleared condition, when all the count values are less than a lower threshold value, and when the overload condition is less than a lower threshold value.

6. An apparatus according to claim 5, wherein
   the control enforcing means enforces the traffic control by inhibiting the use of the signalling link whose priority value is lower than the priority value corresponding to the congestion-condition level, and by substituting for the inhibited signalling link a signalling link belonging to another signal processor.

7. An apparatus according to claim 6, further comprising means for rejecting a request for inhibiting the use of the signalling link when there is a signalling point that is expected to become unable to communicate when the use of the signalling link is inhibited by the control enforcing means.

8. An apparatus according to claim 6, further comprising means for switching the inhibited signalling link back into operation when there arises a signalling point that has become unable to communicate after the use of the signalling link is inhibited by the control enforcing means.

* * * * *